United States Patent
Patel et al.

(10) Patent No.: US 10,908,607 B2
(45) Date of Patent: Feb. 2, 2021

(54) ENHANCED TRAFFIC JAM ASSIST

(71) Applicant: Ford Global Technologies, LLC, Dearborn, MI (US)

(72) Inventors: Rinku Patel, Kalamazoo, MI (US); Christopher Melgar, Royal Oak, MI (US); Andrew Niedert, Farmington Hills, MI (US); Phil Lenius, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 46 days.

(21) Appl. No.: 15/826,973

(22) Filed: Nov. 30, 2017

(65) Prior Publication Data
US 2019/0163180 A1  May 30, 2019

(51) Int. Cl.
*G05D 1/00* (2006.01)
*G08G 1/16* (2006.01)
*G08G 1/09* (2006.01)
*G05D 1/02* (2020.01)
*G08G 1/01* (2006.01)

(52) U.S. Cl.
CPC ......... *G05D 1/0088* (2013.01); *G05D 1/0287* (2013.01); *G08G 1/0112* (2013.01); *G08G 1/0133* (2013.01); *G08G 1/091* (2013.01); *G08G 1/161* (2013.01); *G08G 1/162* (2013.01); *G08G 1/166* (2013.01); *G05D 2201/0213* (2013.01)

(58) Field of Classification Search
CPC ... B60W 30/09; G05D 1/0088; G05D 1/0287; G05D 2201/0213; G08G 1/166; G08G 1/091; G08G 1/161; G08G 1/162; G08G 1/0112; G08G 1/0133
See application file for complete search history.

(56) References Cited

U.S. PATENT DOCUMENTS

| | | | | |
|---|---|---|---|---|
| 5,899,953 A | * | 5/1999 | Urahashi | B60W 10/06 701/117 |
| 7,734,403 B2 | * | 6/2010 | Baijens | B60T 8/24 340/903 |
| 9,452,780 B2 | | 9/2016 | Schumacher et al. | |
| 9,586,581 B2 | * | 3/2017 | Strauss | G08G 1/161 |
| 9,612,123 B1 | * | 4/2017 | Levinson | G01C 21/32 |

(Continued)

FOREIGN PATENT DOCUMENTS

| CN | 106218636 A | 12/2016 |
|---|---|---|
| DE | 102011055495 B4 | 8/2014 |
| WO | 2017003052 A1 | 1/2017 |

OTHER PUBLICATIONS

Meiring et al. article entitled "A Review of Intelligent Driving Style Analysis Systems and Related Artificial Intelligence Algorithms," Sensors (Basel). Dec. 2015; 15(12): 30653-30682, Published online Dec. 4, 2015. doi: 10.3390/s151229822, https://www.ncbi.nlm.nih.gov/pmc/articles/PMC4721742/, printed Sep. 20, 2017.

*Primary Examiner* — Russell Frejd
(74) *Attorney, Agent, or Firm* — Frank A. MacKenzie; Bejin Bieneman PLC

(57) ABSTRACT

Acceleration data is received for each of a plurality of times $t_1 \ldots t_n$, from one or more components in a host vehicle. A traffic jam assist (TJA) system is based on the acceleration data, thereby actuating one or more of steering, braking, and propulsion.

20 Claims, 2 Drawing Sheets

(56) References Cited

U.S. PATENT DOCUMENTS

| | | | |
|---|---|---|---|
| 9,669,833 B2* | 6/2017 | Abdel-Rahman | B60W 30/18163 |
| 10,121,373 B2* | 11/2018 | Makowitz | G08G 1/096791 |
| 2008/0294319 A1* | 11/2008 | Baijens | B60T 8/24 701/70 |
| 2011/0257862 A1* | 10/2011 | Lee | B60T 7/22 701/96 |
| 2014/0032104 A1* | 1/2014 | Witkemper | G01C 21/3685 701/516 |
| 2014/0095059 A1* | 4/2014 | Kandal | G08G 1/0112 701/119 |
| 2015/0148985 A1 | 5/2015 | Jo | |
| 2015/0183369 A1* | 7/2015 | Fu | B60O 5/00 340/425.5 |
| 2015/0266377 A1* | 9/2015 | Hampiholi | H04M 1/72552 455/466 |
| 2015/0269841 A1* | 9/2015 | Makowitz | G06K 9/00825 348/149 |
| 2015/0283998 A1* | 10/2015 | Lind | B60W 30/17 701/23 |
| 2016/0086486 A1* | 3/2016 | Maeda | G08G 1/096716 701/119 |
| 2016/0193997 A1 | 7/2016 | Yellambalase et al. | |
| 2016/0210852 A1* | 7/2016 | Buchholz | G08G 1/0133 |
| 2016/0314687 A1* | 10/2016 | Koshizen | G08G 1/052 |
| 2016/0355185 A1* | 12/2016 | Grinenval | B60W 30/10 |
| 2016/0358477 A1* | 12/2016 | Ansari | G08G 1/167 |
| 2017/0021833 A1* | 1/2017 | Abdel-Rahman | B60W 50/14 |
| 2017/0120904 A1* | 5/2017 | Kentley | G01C 21/32 |
| 2017/0190354 A1* | 7/2017 | Ko | B62D 15/0285 |
| 2018/0017392 A1* | 1/2018 | Claudel | G01C 21/32 |
| 2018/0143639 A1* | 5/2018 | Singhal | G01S 13/862 |
| 2018/0222480 A1* | 8/2018 | Shokonji | B60K 31/0008 |
| 2018/0247527 A1* | 8/2018 | Biehle | G08G 1/0112 |
| 2019/0016340 A1* | 1/2019 | Bae | B60W 30/14 |
| 2019/0080593 A1* | 3/2019 | Mizuta | G08G 1/0116 |
| 2019/0122558 A1* | 4/2019 | Matsunaga | G01S 13/867 |

\* cited by examiner

ENHANCED TRAFFIC JAM ASSIST

BACKGROUND

Operating a motor vehicle in a traffic jam can present numerous challenges. For example, vehicles may be called upon not only to operate at relatively low speeds over long distances, but traffic jams very often involve frequent stops and starts. Operating a vehicle in a traffic jam can result in reduced fuel economy, increased where on vehicle components such as powertrain, brakes, etc. Moreover, vehicles can be at particular risk of collision, e.g., due to a rear-end collision with a proceeding vehicle and/or when changing lanes to attempt to escape the traffic jam and/or find a faster lane of travel. The risks and disadvantages of operating a vehicle in a traffic jam can grow the longer a human driver operates the vehicle in the traffic jam due to boredom, impatience, and fatigue.

Automated traffic jam assist (TJA) systems have been developed and implemented in some motor vehicles to attempt to reduce problems of operating efficiency and increased collision risks. A TJA could, for example, use vehicle sensors such as cameras, radar, and the like, to identify lane markings and a position of a preceding vehicle, whereby a vehicle computer could operate the vehicle to maintain a lane and a distance from the preceding vehicle.

However, it is a problem that existing TJA systems lack technology to be activated in appropriate circumstances. For example, existing TJA systems often require human input for activation. Such human input may not be provided, and even if it is, presents increased risk, e.g., may not be timely provided, may increase driver distraction, etc. Further, existing technology for identifying traffic jams suffers from deficiencies. For example mapping applications supplied with real-time traffic data to predict a traffic jam for a vehicle in conjunction with a vehicle's detected Global Position System (GPS) location can be inaccurate or untimely.

DETAILED DESCRIPTION

Figure 1:
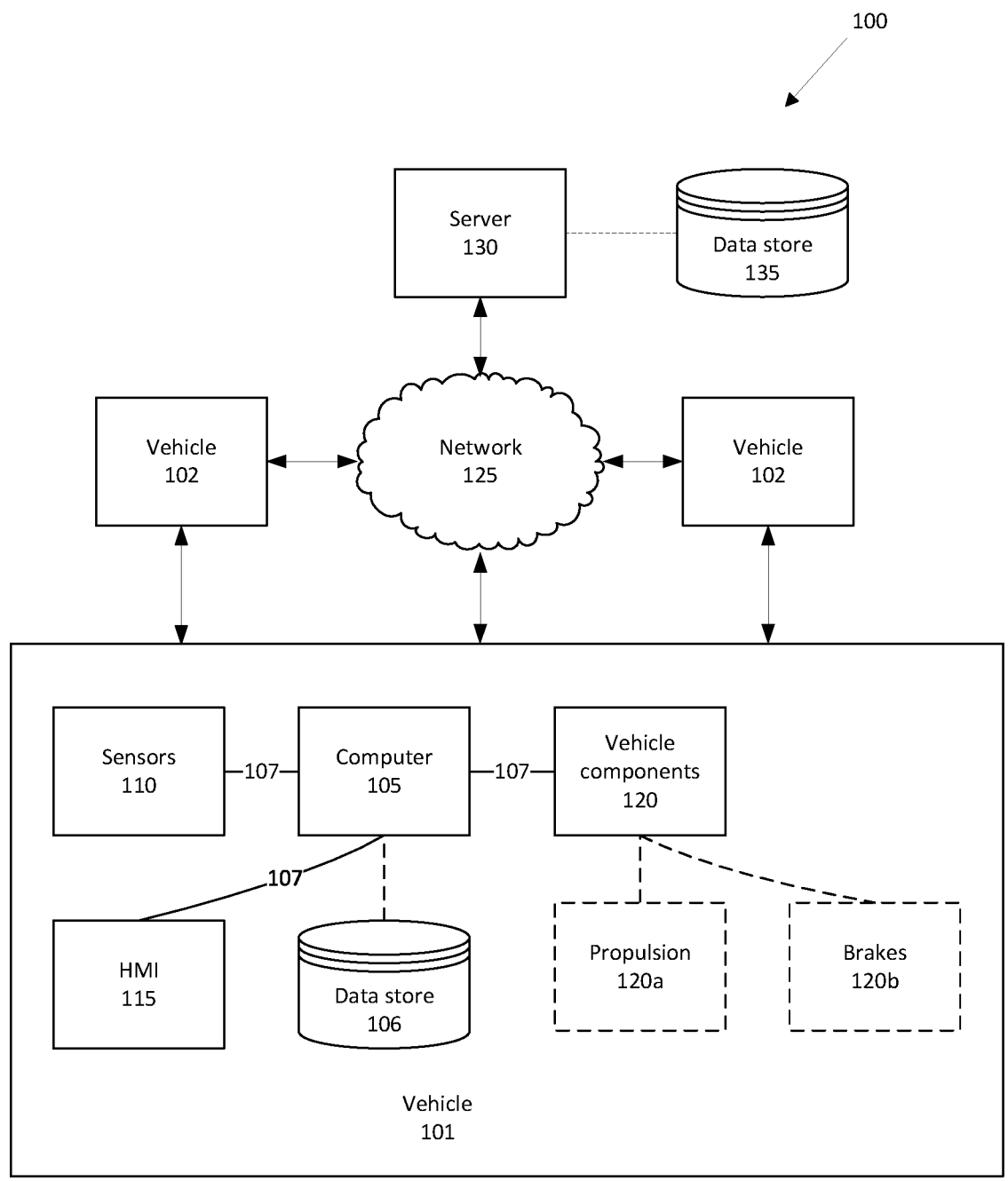
FIG. 1 is a block diagram of an example vehicle traffic jam assist system.

The present disclosure includes a method, comprising: receiving acceleration data, for each of a plurality of times $t_1 \ldots t_n$, from one or more components in a host vehicle; and activating a traffic jam assist (TJA) system based on the acceleration data, thereby actuating one or more of steering, braking, and propulsion.

The one or more components can include the propulsion and braking. Receiving the acceleration data from the one or more components can include receiving data from each of the propulsion and the braking. The acceleration data can include a positive acceleration at one of the times and a negative acceleration at another of the times.

The method can further comprise receiving data from a remote source that is one of a second vehicle and a computer outside the host vehicle indicating a traffic jam, wherein activating the TJA is based on the data from the remote source in addition to the data from one or more components in the host vehicle.

The method can further comprise detecting a second vehicle proximate to the host vehicle, wherein activating the TJA is further based on detecting the second vehicle proximate to the host vehicle. Detecting the second vehicle proximate to the host vehicle can include detecting a plurality of distances of the second vehicle from the host vehicle. The method can further comprise detecting a third vehicle proximate to the host vehicle, wherein activating the TJA is further based on detecting the third vehicle proximate to the host vehicle.

Further disclosed is a computer, comprising a processor and a memory, the memory storing instructions executable by the processor to receive acceleration data, for each of a plurality of times $t_1 \ldots t_n$, from one or more components in a host vehicle; and activate a traffic jam assist (TJA) system based on the acceleration data, thereby actuating one or more of steering, braking, and propulsion.

The one or more components can include the propulsion and braking. Receiving the acceleration data from the one or more components can include receiving data from each of the propulsion and the braking. The acceleration data can include a positive acceleration at one of the times and a negative acceleration at another of the times.

The memory of the computer can further store instructions to receive data from a remote source that is one of a second vehicle and a second computer outside the host vehicle indicating a traffic jam, wherein activating the TJA is based on the data from the remote source in addition to the data from one or more components in the host vehicle.

The memory of the computer can further store instructions to detect a second vehicle proximate to the host vehicle, wherein activating the TJA is further based on detecting the second vehicle proximate to the host vehicle.

The instructions to detect the second vehicle proximate to the host vehicle can include instructions to detect a plurality of distances of the second vehicle from the host vehicle.

The memory of the computer can further store instructions to detect a third vehicle proximate to the host vehicle, wherein activating the TJA is further based on detecting the third vehicle proximate to the host vehicle.

Further, a system can comprise a vehicle communication network; a traffic jam assist (TJA) system communicatively coupled to the vehicle communication network; and a computer that is communicatively coupled to the vehicle communication network and that includes a processor and a memory, the memory storing instructions executable by the processor to receive acceleration data, for each of a plurality of times $t_1 \ldots t_n$, from one or more components in a host vehicle, and provide a command to activate the (TJA) system based on the acceleration data, thereby actuating one or more of steering, braking, and propulsion.

The one or more components can include the propulsion and braking. Receiving the acceleration data from the one or more components can include receiving data from each of the propulsion and the braking. The acceleration data can include a positive acceleration at one of the times and a negative acceleration at another of the times.

The memory of the computer included in the system can further store instructions to detect a second vehicle proximate to the host vehicle, wherein activating the TJA is further based on detecting the second vehicle proximate to the host vehicle.

FIG. 1 illustrates an example system 100, in which a vehicle 101 includes a computer 105 programmed to send and receive data and to actuate vehicle 101 components 120 as described herein. For example, the computer 105 may include programming for a traffic jam assist (TJA) system; as such, the computer 105 may include programming such as is known to allow the vehicle 101 to navigate when the TJA system is activated. Moreover, the computer 105 may include special and advantageous programming to solve the problem identified above of timely and/or appropriately activating the TJA system as conventionally known.

In addition to the vehicle 101, other vehicles 102 are included in the example system 100 illustrated in FIG. 1. The following description, unless explicitly noted otherwise, is made with reference to the vehicle 101, which for convenience may sometimes be referred to as a first vehicle 101 or host vehicle 101. The other vehicles 102 may be referred to as second or target vehicles 102. In general, the vehicles 102 are motor vehicles or the like capable of navigating a roadway with the host vehicle 101.

The computer 105 is generally programmed for communications on a vehicle 101 network 107, e.g., including a communications bus, and/or other wired or wireless mechanisms (e.g., a wired or wireless local area network in the vehicle 101). Via the network 107, the computer 105 may transmit and receive data to and from various components 120 and/or devices in a vehicle 101 and/or receive messages from the various devices, e.g., controllers, actuators, sensors, etc., including sensors 110, an HMI 115, and components 120. Alternatively, or additionally, in cases where the computer 105 actually comprises multiple devices, the vehicle network may be used for communications between devices represented as the computer 105 in this disclosure.

The computer 105 typically includes and/or may be in communication with, typically via the network 107, a navigation system, e.g., a system that provides a vehicle 101 location according to global positioning system (GPS) coordinates or the like.

In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, dedicated short range communications (DSRC) or some other protocol for vehicle-to-vehicle (V2V) communications, etc. The computer 105 may include or be coupled to circuits, chips, antennas, transmitters, receivers, and/or other conventional electronic components to send and receive data as described herein.

The computer 105 can receive and/or send data to and from a remote source for digital information, such as a remote computer 130, via the network 125. For example, the computer 105 can provide location data to the remote computer 130. In response, the remote computer 130 can provide traffic data pertinent to the vehicle 101 location. For example, the remote computer 130 can provide data predicting, or from which the computer 105 can predict, a vehicle 101 speed when the vehicle 101 is at a specified location on a roadway. Alternatively or additionally, the remote computer 130 can provide data about a density of traffic at a location or on a segment (i.e., first and second locations define and points of a segment) of a roadway. A traffic density is a number of vehicles to pass a location per unit of time, e.g., 10 vehicles 101, 102 per minute. When vehicle 101 speed is predicted to be below a predetermined threshold (e.g., 10 miles per hour, 20 miles per hour, etc.) and/or a traffic density is predicted to be above a predetermined threshold (e.g., 20 vehicles per minute at a location), the computer 105 may be programmed to identify a traffic jam.

The data store 106, sometimes referred to as a computer 105 memory, may be of any type, e.g., hard disk drives, solid state drives, servers, or any volatile or non-volatile media. The data store 106 may store data provided from the sensors 110.

The in-vehicle communication network 107 includes hardware, such as a communication bus, for facilitating communication among vehicle 101 sensors 110, components 120, etc. The in-vehicle communication network 107 may include one or more communication protocols such as controller area network (CAN), Ethernet, WiFi, Local Interconnect Network (LIN), and/or other wired or wireless mechanisms.

Sensors 110 may include a variety of devices that provide data to the computer 105, typically via the vehicle network 107. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of an object, determining the presence of a user, etc. The sensors 110 could also include a LIDAR, short range radar, long range radar, and/or ultrasonic transducers.

The vehicle 101 can include a human-machine interface (HMI) 115, e.g., one or more of a display, a touchscreen display, a microphone, a speaker, etc.

The vehicle 101 may include a plurality of vehicle components 120. Each vehicle component 120 includes one or more hardware components adapted to perform a mechanical function or operation-such as moving the vehicle, slowing or stopping the vehicle, steering the vehicle, etc. Non-limiting examples of components 120 include conventional vehicle parts or subsystems, such as a vehicle powertrain or propulsion component 120a (that includes, e.g., an internal combustion engine and/or an electric motor, etc.), a transmission component, a vehicle steering component (e.g., that may include one or more of a steering wheel, a steering rack, etc.), a vehicle brake component 120b, a park assist component, an adaptive cruise control component, an adaptive steering component, etc.

In particular, a propulsion component 120a can include a powertrain control module (PCM), and a brake component 120b can include a brake control module (BCM). The PCM and BCM are electronic control units (ECUs) known for controlling vehicle 101 powertrain and brake components 120a, 120b, and for providing data via the vehicle 101 network concerning the respective components 120a, 120b. That is, the PCM and BCM can provide data via the vehicle 101 network, e.g., controller area network (CAN) communication bus, regarding vehicle 101 acceleration, deceleration, braking, etc. For example, the PCM can provide data about vehicle 101 acceleration and/or speed over time, as well as data about a driver demand over time, i.e., requested vehicle speed based on driver input, e.g., to accelerator pedal, over time, indicating a driver's requested acceleration and/or deceleration. Similarly, the BCM can provide data about application of vehicle 101 brakes over time, e.g., data about applied brake pressure or the like.

The propulsion component 120a translates stored energy into motion of the vehicle 101. The propulsion 120a may be a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 120a, via an ECU, i.e., PCM, can be in communication with, providing data to and receiving input from, the vehicle computer 105 and/or from a human driver. The human driver may control the propulsion component 120a via an input device, e.g., an accelerator pedal and/or a gear-shift lever.

The brake component 120b can be a conventional brake subsystem that can resist the motion of the vehicle 101 to thereby slow and/or stop the vehicle 101. The brake component 120b may include friction brakes such as disc brakes, drum brakes, band brakes, etc.; regenerative brakes; a parking brake; any other suitable type of brakes; or a combination. The brake system 32 can include an ECU, i.e., a BCM, that is in communication with, providing data to and receiving input from, the vehicle computer 105. The brake component 120b can actuate brakes to resist the motion of the vehicle 101, e.g., upon a command from the computer 105 and/or from a human driver. The human driver may control the brake component 120b via an input device, e.g., a brake pedal.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion, braking, and steering components 120 are controlled by the computer 105. A semi-autonomous mode is one in which at least one of these components are controlled at least partly by the computer 105 as opposed to a human operator. In a non-autonomous mode, each of propulsion, braking, and steering components 120 are controlled according to input from a human operator.

The computer 105 can be further programmed to actuate vehicle 101 components 120 to implement a traffic jam assist (TJA) system as is known. When the TJA system is activated so that the computer 105 is operating the vehicle 101 according to programming implemented as part of the TJA system, the vehicle 101 is operating in a semi-autonomous mode. The TJA system can control vehicle 101 speed and/or steering to maintain the vehicle 101 in a traffic lane, maintain a distance between the vehicle 101 and a preceding and/or following target vehicle 102, etc.

The network 125 (sometimes referred to as the wide area network 125 because it can include communications between devices that are geographically remote from one another, i.e., not in a same building, vehicle, etc.,) represents one or more mechanisms by which various devices, e.g., the vehicle 101 computer 105, one or more second vehicles 102, etc., may communicate with each other. Accordingly, the network 125 may be one or more wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area network (WAN), including the Internet, providing data communication services.

The remote server 130 is a computer with a processor and a memory, the memory storing instructions such that the processor is programmed to carry out operations as disclosed herein. The data store 135 is a memory, medium, etc., included in or coupled to the server 130.

Figure 2:
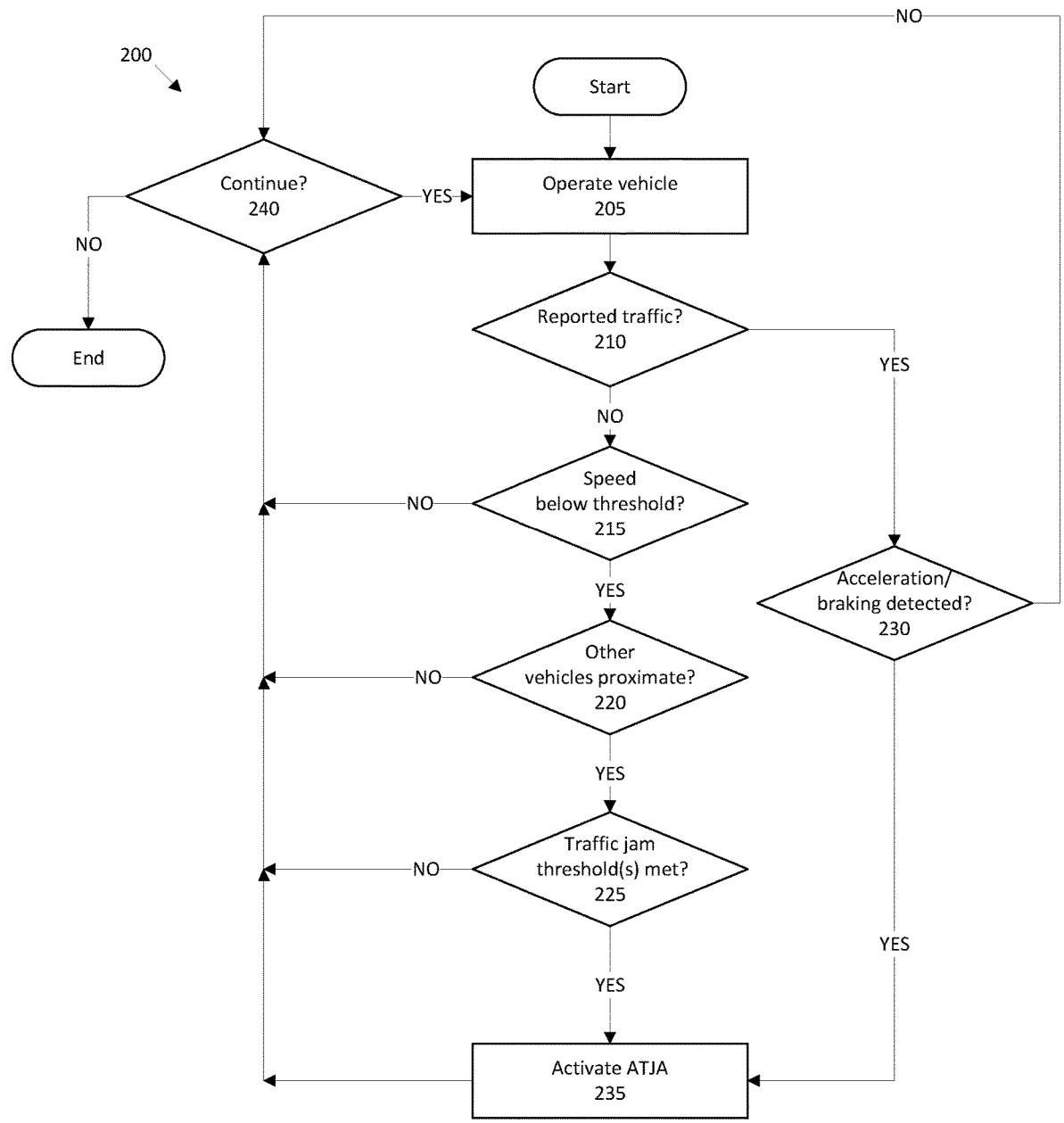
FIG. 2 is an example process for triggering the vehicle traffic jam assist system of FIG. 1.

FIG. 2 illustrates an example process 200 for triggering the vehicle traffic jam assist system of FIG. 1. Blocks of the process 200 may be carried out according to programming implemented in a vehicle 101 computer 105 in conjunction with other elements as may be described below.

The process 200 begins in a block 205, in which the host vehicle 101 is operated, meaning that a propulsion component 120a is activated and the vehicle 101 is in motion or capable of motion, including being braked and/or steered, on a roadway.

Next, in a block 210, the computer 105 determines whether data has been received predicting that a traffic jam is present at or proximate to (i.e., within a predetermined distance, such as 200 meters, 500 meters, etc.) a location of the vehicle 101. For example, such data could be received via the network 125, predicting or from which it may be predicted that vehicle 101 speed (i.e., velocity) is below a predetermined threshold, e.g., 20 miles per hour, and/or will be below the predetermined threshold at a location within a predetermined distance, e.g., 100 meters, 500 meters, etc., of a current location of the vehicle 101. Further for example, such data could be received from a remote computer 130 providing traffic data, e.g., predicted vehicle 101, 102 speeds at a specified location and/or a traffic density at the location. Alternatively or additionally, data for predicting a traffic jam could be provided via vehicle-to-vehicle communications from other vehicles 102 within a proximity (i.e., a predetermined distance such as 500 meters, a kilometer, etc.) of the host vehicle 101. For example, one or more other vehicles 102 could provide their respective locations and speeds, from which the host vehicle 101 computer 105 could predict a speed for the host vehicle 101 at the respective locations of the one or more other vehicles. If such speed were below the predetermined threshold, it could be predicted that a traffic jam is present.

If a traffic jam is predicted in the block 210, then the process 200 proceeds to a block 230. Otherwise, a block 215 is executed next. Further, although not illustrated in FIG. 2, note that the block 210 could be omitted from the process 200. Yet further alternatively, the block 210 need not be a decision block, i.e., implementations are possible in which the computer 105 is programmed to determine whether data via the network 125 or some other source external to the vehicle 101 has been received predicting a traffic jam, and is further programmed to proceed to the block 215 regardless of the result of this determination.

In the block 215, the computer 105 determines whether current speed of the vehicle 101 is below a threshold, e.g., 20 miles per hour. If so, a block 220 is executed next. Otherwise, the process 200 proceeds to a block 240.

The block 215 could be omitted, but is typically included to prevent activation of a traffic jam assist system when a traffic jam is not present. That is, the block 210 could include receipt of V2V communications, substantially real-time map data predicting a traffic jam ahead on a route being traveled by the vehicle 101, sensor 110 data indicating that vehicles 101, 102 are traveling close together (see the block 220 below), etc. Checking the vehicle 101 speed can prevent incorrectly predicting a traffic jam, e.g., where vehicles 101, 102 are traveling relatively close together at a high rate of speed.

In the block 220, the computer 105 determines whether other vehicles 102 are detected proximate to, i.e., within a predetermined distance of, the vehicle 101. The predetermined distance may be stored in the computer 105 memory, and may be a distance determined to indicate a likelihood of a traffic jam when the vehicle 101 is traveling below the threshold speed of the block 215. For example, if the threshold speed is 20 miles per hour, then detecting, e.g., using sensors 110 as described above, a second vehicle 102 within 5 meters of the host vehicle 101 may be deemed to be predictive of a traffic jam. Additionally, the computer 105 memory could store a set of predetermined distances to determine second vehicle 102 proximity according to a speed of the host vehicle 101, e.g., a table or the like specifying respective proximity distances for respective speeds. For example, a proximity distance could be to meters if the vehicle 101 is traveling at five miles an hour or less, 5 meters if the vehicle 101 is traveling at 10 miles per hour or less, and 10 meters if the vehicle 101 is traveling at 20 miles per hour or less.

If other vehicles 102 are determined to be within a proximity of the host vehicle 101, then a block 225 is executed next. Otherwise, the process 200 proceeds to the block 240.

In the block 225, the computer 105 determines whether one or more data values meet or exceed one or more thresholds, thereby predicting a traffic jam. For example, the computer 105 could determine that vehicle 101 braking and/or acceleration thresholds have been met, thereby predicting a traffic jam. A braking threshold is a number (typically a deceleration, i.e., negative acceleration, value) that can be compared to a number received or computed by the computer 105 based on data about brake component 120b operation, e.g., deceleration at a moment in time. An acceleration threshold is a number (typically a positive acceleration value) that can be compared to a number received or computed by the computer 105 based on data about propulsion component 120a operation, e.g., acceleration at a moment in time. The braking threshold and the acceleration threshold are each provided for comparison to numbers that are measures of changes in vehicle 101 speed over time or distance, e.g., ratios or percentages of time or distance spent braking and/or accelerating. Further, the braking and acceleration thresholds may be combined to evaluate, by considering together different measures of changes in vehicle 101 speed, whether the vehicle 101 is in a traffic jam.

Yet further the threshold value could in fact be multiple values related to distance(s) of the vehicle 101 from other vehicle(s) 102 and/or speed of the vehicle 101. For example, the computer 105 could determine an average speed for the period of time, and a peak speed in the period of time. Typically the computer 105 would also record that the vehicle 101 came to a stop, or fell below a specified speed (e.g., 2 kph), in the time period. A lookup table or the like can store average speeds and corresponding peak speeds for various time periods that indicate a traffic jam. A standard deviation and a variance from the average speed and/or peak speed for the time period, which would be threshold value(s) for the block 225, could then be calculated (e.g., in a manner shown in formulas given below). If the detected average speed and/or peak speed for the time period were outside the standard deviation and/or variance, then the computer could determine that one or more thresholds were met and predict a traffic jam.

Further for example, the computer 105 could receive data indicating a percentage of time or distance that a brake component 120b has been engaged for a specified time or distance, e.g., the last 30 seconds, the last 500 meters, etc. If that percentage met or exceeded a predetermined threshold, e.g., 25 percent, a traffic jam could be predicted.

Further for example, the computer 105 could receive data indicating a percentage of time or distance that a propulsion component 120a has been engaged in accelerating the vehicle 101 for a specified time or distance, e.g., the last 30 seconds, the last 500 meters, etc. If that percentage met or exceeded a predetermined threshold, e.g., 25 percent, a traffic jam could be predicted.

Yet further, a brake threshold and an acceleration threshold could be combined. For example, if an average percentage of braking over time or distance and acceleration over time or distance (i.e., derivatives of vehicle 101 speed) met or exceeded a predetermined threshold, e.g., 25 percent, a traffic jam could be predicted. Yet further for example, the computer 105 could record an amount of acceleration that is applied and multiply that value by an amount of time for which the acceleration is applied. This product could then be added to an amount of braking (i.e., deceleration or negative acceleration) that is applied multiplied by the amount of time for it is applied. If this resulting sum exceeds a specified threshold value, then a traffic jam could be predicted. An example formula could be:

$$(A_1 T_1 + A_2 T_2 + \ldots + A_x T_x) + (B_1 T_1 + B_2 T_2 + \ldots B_x T_x) > \text{Threshold},$$

where $A_{1 \ldots x}$ are respective accelerations for times $T_{1 \ldots x}$, and $B_{1 \ldots x}$ are respective braking forces (decelerations) for times $T_{1 \ldots x}$ (that may be different than the times $T_{1 \ldots x}$ for the acceleration measurements). The time factors in the above are important because a vehicle 101 could be moving at a relatively constant speed at which high acceleration and braking could occur for extremely small periods of time, e.g., less than one second, without significant changes in speed. Considering a time period above a minimum amount of time (e.g., three seconds) can eliminate such "false" traffic jam behavior. Further, the time should not be too long, e.g., more than one or two minutes. This prevents a false traffic jam prediction in the situation where, for example, a vehicle 101 has been in a traffic jam for the past thirty minutes, but then in the next two minutes the traffic jam clears up. Considering thirty-two minutes of data would heavily favor a traffic jam scenario when there is likely none.

Yet further, the computer 105 could record distances at successive times, e.g., sampling could occur multiple times per second, of vehicles 102 to the front and rear of the vehicle 101. For example, sensors 110 could include forward and rear cameras mounted in or on the vehicle 101 having respective fields of view to the from and rear of the vehicle 101, and/or could include radar and/or ultrasonic sensors 110 so mounted. Using data from such sensors 110, techniques are known for estimating a distance of a target object, in the case, a target vehicle 102 to the front or rear of the host vehicle 101. For example, the computer 105 could record distances at successive respective times, e.g., every few milliseconds depending on the capability and sampling rate of the sensors 110, of vehicles 101. If distances over a period of time to front and rear target vehicles 102 changed by more than a threshold, the computer 105 could predict a traffic jam.

As an example of determining distances over a period of time n, consider an example in which sensors 110 provide distances to a forward vehicle 102 at successive times $t_n$, $t_{n-1}$, $t_{n-2}$, ... $t_{n-n}$. Distances to a rear vehicle could likewise be determined for the times $t_n$, $t_{n-1}$, $t_{n-2}$, ... $t_{n-n}$. Average distances to the respective front and rear vehicles 102 could then be calculated over the period of time n. From the average, a standard deviation and variance could be calculated for each of the distances (i.e., to the front and rear vehicles 102). If the standard deviations and/or variances for both the front and rear distances exceed a threshold, this can be taken to mean that the front and rear distances have both changed during the time period n. If vehicle 101 speed has decreased by a threshold (e.g., by 20 kph or more) in the time period n, then a traffic jam could be predicted. Conversely, if vehicle 101 speed has increased by a threshold (e.g., 20 kph or more) then this may mean that a traffic jam has dissipated.

A formula to determine an average distance $F_{dn\_avg}$ to a vehicle 102 in front of a host vehicle 101 over the time period n, for distances $F_{d1} \ldots F_{dn}$, could be:

$$\frac{F_{d1} + F_{d2} + \ldots + F_{dn}}{n} = F_{dn_{avg}}$$

A formula to determine an average distance $R_{dn\_avg}$ to a vehicle 102 in front of a host vehicle 101 over the time period n, for distances $R_{d1} \ldots R_{dn}$, could be:

$$\frac{R_{d1} + R_{d2} + \ldots + R_{dn}}{n} = R_{dn_{avg}}$$

The variances could be determined by $$((F_{d1}-F_{dn_{avg}})^2 + (F_{d2}-F_{dn_{avg}})^2 + \ldots + (F_{dn}-F_{dn_{avg}})^2)/n = F\_Var$$

and $$((R_{d1}-R_{dn_{avg}})^2 + (R_{d2}-R_{dn_{avg}})^2 + \ldots + (R_{dn}-R_{dn_{avg}})^2)/n = R\_Var$$

where standard deviation is given by $$Stdev = Var^{\frac{1}{2}}.$$

Yet further alternatively, a traffic jam could be predicted by calculating the variation and standard deviation of vehicle 101 speed over time by sampling the speed over a time period n (rather than distances to vehicles 102, as described above. For a speed S over the time period n, the following could be computed:

$$\frac{S_{d1} + S_{d2} + \ldots + S_{dn}}{n} = S_{dn_{avg}} \quad \text{and}$$

$$((S_{d1} - S_{dn_{avg}})^2 + (S_{d2} - S_{dn_{avg}})^2 + \ldots + (S_{dn} - S_{dn_{avg}})^2)/n =$$

$$S\_Var \text{ and } Stdev = Var^{\frac{1}{2}}.$$

If the above speed S variance and standard deviation pass predetermined thresholds this means that there have been wide changes in vehicle speed, in turn indicating a braking and accelerating behavior predictive of a traffic jam.

When the thresholds of the block 225 are not met, the process 200 proceeds to the block 240. Otherwise, the process 200 proceeds to a block 235.

The block 230 may follow the block 210, as mentioned above, when, in the block 210, a determination is made based on received data that a traffic jam is predicted. The purpose of the block 230 is to confirm that a traffic jam is predicted by analyzing vehicle 101 data, e.g., data relating to acceleration and deceleration for a period of time, e.g., thirty seconds, one minute, etc., preceding the current time. For example, the computer 105 could determine that the vehicle 101 had accelerated and/or decelerated (e.g., braked) for more than a threshold percentage, e.g., 75%, of the period of time. If so, the traffic jam could be confirmed, and the process 200 could proceed to the block 235. However, if a traffic jam is not confirmed in the block 230, the process 200 proceeds to the block 240.

In the block 235, the computer 105 activates the traffic jam assist (TJA) system. The process 200 then proceeds to the block 240.

In the black 240, the computer 105 determines whether the process 200 should continue, e.g., the vehicle 101 could be powered down, placed in a "park" state, etc., whereupon the computer 105 could be programmed to terminate the process 200. If the process 200 should continue, the process 200 returns to the block 205. Otherwise, the process 200 ends following the block 240.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

When this disclosure refers to a "location," it is to be understood that the location could be determined in a known manner, e.g., according to geo-coordinates such as are known. For example, global positioning system (GPS) devices can determine latitude and longitude with great precision, and could be used to determine locations discussed herein.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A method, comprising:
   receiving acceleration data, for each of a plurality of times $t_1 \ldots t_n$, from one or more components in a host vehicle;
   determining that a value that is based on a plurality of respective acceleration data for each of the plurality of times $t_1 \ldots t_n$ exceeds a threshold; and
   activating a traffic jam assist (TJA) system upon determining that the value exceeds the threshold, thereby actuating one or more of steering, braking, and propulsion.

2. The method of claim 1, wherein the one or more components include the propulsion and braking.

3. The method of claim 2, wherein receiving the acceleration data from the one or more components includes receiving data from each of the propulsion and the braking.

4. The method of claim 3, wherein the acceleration data includes a positive acceleration at one of the times and a negative acceleration at another of the times.

5. The method of claim 1, further comprising receiving data from a remote source that is one of a second vehicle and a computer outside the host vehicle indicating a traffic jam, wherein activating the TJA is based on the data from the remote source in addition to the data from one or more components in the host vehicle.

6. The method of claim 1, further comprising detecting a second vehicle proximate to the host vehicle, wherein activating the TJA is further based on detecting the second vehicle proximate to the host vehicle.

7. The method of claim 6, wherein detecting the second vehicle proximate to the host vehicle includes detecting a plurality of distances of the second vehicle from the host vehicle.

8. The method of claim 6, further comprising detecting a third vehicle proximate to the host vehicle, wherein activating the TJA is further based on detecting the third vehicle proximate to the host vehicle.

9. A computer, comprising a processor and a memory, the memory storing instructions executable by the processor to:
   receive acceleration data, for each of a plurality of times $t_1 \ldots t_n$, from one or more components in a host vehicle;
   determining that a value that is based on a plurality of respective acceleration data for each of the plurality of times $t_1 \ldots t_n$ exceeds a threshold; and
   activate a traffic jam assist (TJA) system upon determining that the value exceeds the threshold, thereby actuating one or more of steering, braking, and propulsion.

10. The computer of claim 9, wherein the one or more components include the vehicle propulsion and braking.

11. The computer of claim 10, wherein instructions to receive the acceleration data from the one or more components include instructions to receive data from each of the propulsion and the braking.

12. The computer of claim 9, wherein the acceleration data includes a positive acceleration at one of the times and a negative acceleration at another of the times.

13. The computer of claim 9, the memory of the computer storing further instructions to receive data from a remote source that is one of a second vehicle and a second computer outside the host vehicle indicating a traffic jam, wherein activating the TJA is based on the data from the remote source in addition to the data from one or more components in the host vehicle.

14. The computer of claim 9, the memory of the computer storing further instructions to detect a second vehicle proximate to the host vehicle, wherein activating the TJA is further based on detecting the second vehicle proximate to the host vehicle.

15. The computer of claim 14, wherein instructions to detect the second vehicle proximate to the host vehicle include instructions to detect a plurality of distances of the second vehicle from the host vehicle.

16. The computer of claim 14, the memory of the computer storing further instructions to detect a third vehicle proximate to the host vehicle, wherein activating the TJA is further based on detecting the third vehicle proximate to the host vehicle.

17. A system, comprising:
   a vehicle communication network;
   a traffic jam assist (TJA) system communicatively coupled to the vehicle communication network; and
   a computer that is communicatively coupled to the vehicle communication network and that includes a processor and a memory, the memory storing instructions executable by the processor to receive acceleration data, for each of a plurality of times $t_1 \ldots t_n$, from one or more components in a host vehicle, determining that a value that is based on a plurality of respective acceleration data for each of the plurality of times $t_1 \ldots t_n$ exceeds a threshold; and provide a command to activate the TJA system upon determining that the value exceeds the threshold, thereby actuating one or more of steering, braking, and propulsion.

18. The system of claim 17, wherein the one or more components include the vehicle propulsion and braking.

19. The system of claim 17, wherein the acceleration data includes a positive acceleration at one of the times and a negative acceleration at another of the times.

20. The system of claim 17, the memory of the computer storing further instructions to detect a second vehicle proximate to the host vehicle, wherein activating the TJA is further based on detecting the second vehicle proximate to the host vehicle.

\* \* \* \* \*